(12) United States Patent
Watanabe

(10) Patent No.: US 12,493,275 B2
(45) Date of Patent: Dec. 9, 2025

(54) NUMERICAL CONTROLLER AND MACHINE TOOL

(71) Applicant: Fanuc Corporation, Yamanashi (JP)

(72) Inventor: Toshihiro Watanabe, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 370 days.

(21) Appl. No.: 18/026,436

(22) PCT Filed: Sep. 29, 2021

(86) PCT No.: PCT/JP2021/035826
§ 371 (c)(1),
(2) Date: Mar. 15, 2023

(87) PCT Pub. No.: WO2022/075141
PCT Pub. Date: Apr. 14, 2022

(65) Prior Publication Data
US 2023/0350378 A1   Nov. 2, 2023

(30) Foreign Application Priority Data

Oct. 5, 2020 (JP) .................................. 2020-168585

(51) Int. Cl.
*G05B 19/408* (2006.01)
(52) U.S. Cl.
CPC ............... *G05B 19/4086* (2013.01); *G05B 2219/33263* (2013.01)
(58) Field of Classification Search
None
See application file for complete search history.

(56) References Cited

U.S. PATENT DOCUMENTS

| 2016/0320772 | A1 | 11/2016 | Ono et al. |
| 2018/0225257 | A1 | 8/2018 | Satake |
| 2019/0271965 | A1* | 9/2019 | Tsuda .................. G05B 19/4093 |

FOREIGN PATENT DOCUMENTS

| CN | 108398921 A | 8/2018 |
| JP | 03269604 A | 12/1991 |
| JP | H07-036526 A | 2/1995 |

(Continued)

OTHER PUBLICATIONS

Machine Translation of Makino Milling Machine WO 2015/097886 A1 (Year: 2015).*

(Continued)

*Primary Examiner* — Ryan A Jarrett
(74) *Attorney, Agent, or Firm* — Buchanan Ingersoll & Rooney PC

(57) ABSTRACT

A numerical controller includes an information storage unit that stores, in association with identification information assigned to a tool, coordinate conversion information used to convert a coordinate value in a rotating coordinate system into a coordinate value in a reference coordinate system, an information acquisition unit that acquires, from a machining program, a coordinate value that indicates a movement path of the tool to which the identification information is assigned, and a coordinate conversion unit that performs coordinate conversion of the coordinate value indicating the movement path acquired by the information acquisition unit, based on the coordinate conversion information stored in the information storage unit.

5 Claims, 8 Drawing Sheets

(56) References Cited

FOREIGN PATENT DOCUMENTS

| | | | |
|---|---|---|---|
| JP | 2002127052 A | 5/2002 |
| JP | 2003-195917 A | 7/2003 |
| JP | 2005-034934 A | 2/2005 |
| JP | 2008-112278 A | 5/2008 |
| JP | 2009301232 A | 12/2009 |
| WO | 2015097886 A1 | 7/2015 |

OTHER PUBLICATIONS

Machine Translation of Fanuc JP 2009-301232 A (Year: 2009).*
International Search Report and Written Opinion for International Application No. PCT/JP2021/035826, dated Dec. 14, 2021, 6 pages.
Office Action (The First Office Action) issued Apr. 21, 2025, by the State Intellectual Property Office of People's Republic of China in corresponding Chinese Patent Application No. 202180067001.6 and an English translation of the Office Action. (13 pages).

* cited by examiner

FIG. 4

| TOOL NUMBER | TOOL TYPE | COORDINATE DIFFERENCE INFORMATION |
|---|---|---|
| ⋮ | ⋮ | ⋮ |
| 11 | DRILL | X:45 |
| 12 | TAP | X:45 |
| 13 | END MILL | Null |
| ⋮ | ⋮ | ⋮ |

| TOOL NUMBER | TOOL TYPE | REFERENCE MACHINING DIRECTION | CUTTING DIRECTION |
|---|---|---|---|
| ... | ... | ... | ... |
| 121 | TURNING TOOL | −X | Null |
| 122 | TURNING TOOL | −X | −Y |
| 123 | THREAD CUTTING | −X | Null |
| ... | ... | ... | ... |

| TOOL NUMBER | TOOL TYPE | REFERENCE MACHINING DIRECTION |
|---|---|---|
| ⋮ | ⋮ | ⋮ |
| 131 | TURNING TOOL | −X |
| 132 | TURNING TOOL | −X |
| 133 | THREAD CUTTING | −X |
| ⋮ | ⋮ | ⋮ |

NUMERICAL CONTROLLER AND MACHINE TOOL

CROSS REFERENCE TO RELATED APPLICATIONS

This is the U.S. National Phase application of PCT/JP2021/035826, filed Sep. 29, 2021, which claims priority to Japanese Patent Application No. 2020-168585, filed Oct. 5, 2020, the disclosures of each of these applications being incorporated herein by reference in their entireties for all purposes.

FIELD OF THE INVENTION

The present disclosure relates to a numerical controller and a machine tool.

BACKGROUND OF THE INVENTION

Conventionally, numerical controllers having a coordinate conversion function are known. In a numerical controller having a coordinate conversion function, for example, a movement path of a tool is instructed using coordinate values in a coordinate system acquired by rotating a reference coordinate system by a predetermined angle around a predetermined axis. In this case, coordinate values for instructing the movement path are converted into coordinate values in the reference coordinate system, and the movement of the tool is controlled based on the converted coordinate values.

PATENT LITERATURE

Patent Literature 1: JP 3-269604 A

SUMMARY OF THE INVENTION

However, when coordinate conversion is instructed by the conventional numerical controller, it is necessary to write information such as the rotation center, the rotation direction, and the rotation amount of the coordinate system in the machining program. This makes the machining program more complex, and readability of the machining program may be deteriorated. In addition, such deterioration in the readability of the machining program may lead to machining errors of the workpiece.

The present disclosure has an object to provide a numerical controller and a machine tool capable of improving readability of a machining program and reducing machining errors.

A numerical controller includes an information storage unit that stores, in association with identification information assigned to a tool, coordinate conversion information used to convert a coordinate value in a rotating coordinate system into a coordinate value in a reference coordinate system, an information acquisition unit that acquires, from a machining program, a coordinate value that indicates a movement path of the tool to which the identification information is assigned, and a coordinate conversion unit that performs coordinate conversion of the coordinate value indicating the movement path acquired by the information acquisition unit, based on the coordinate conversion information stored in the information storage unit.

According to the present disclosure, readability of a machining program can be improved and machining errors can be reduced.

BRIEF DESCRIPTION OF DRAWINGS

FIG. 4 is a diagram illustrating an example of information stored in an information storage unit according to a first embodiment.

FIG. 5 is a diagram illustrating an example of a machining program.

FIG. 8 is a diagram illustrating an example of information stored in an information storage unit according to a second embodiment.

FIG. 9 is a diagram illustrating another example of the machining program.

FIG. 10 is a diagram illustrating an example of information stored in an information storage unit according to a third embodiment.

FIG. 11 is a diagram illustrating still another example of the machining program.

DETAILED DESCRIPTION OF EMBODIMENTS OF THE INVENTION

First Embodiment

Hereinafter, a first embodiment will be described with reference to the drawings.

Figure 1:
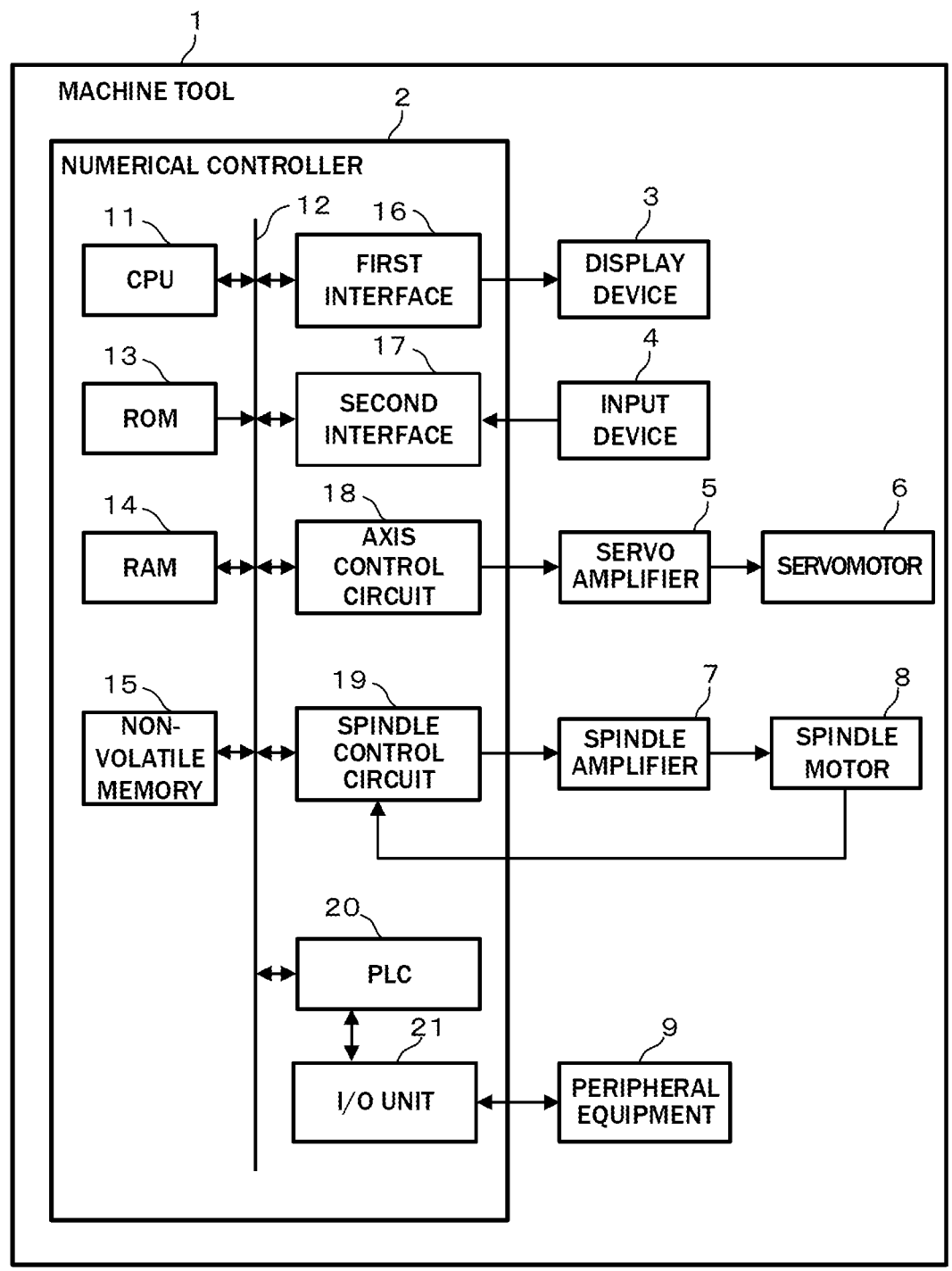
FIG. 1 is a diagram illustrating an example of a hardware configuration of a machine tool.

FIG. 1 is a diagram illustrating an example of a hardware configuration of a machine tool. The machine tool 1 is a machine that machines a workpiece using a tool. The machine tool 1 machines a workpiece using a tool such as an end mill, a cutting tool, or a drill. The machine tool 1 is, for example, a machining center, a lathe, a drilling machine, or a multitasking machine.

The machine tool 1 includes a numerical controller 2, a display device 3, an input device 4, a servo amplifier 5 and a servomotor 6, a spindle amplifier 7 and a spindle motor 8, and a peripheral equipment 9.

The numerical controller 2 is a device that controls the entire machine tool 1. The numerical controller 2 includes a central processing unit (CPU) 11, a bus 12, a read only memory (ROM) 13, a random access memory (RAM) 14, and a nonvolatile memory 15.

The CPU 11 is a processor that controls the entire numerical controller 2 according to a system program. The CPU 11 reads a system program and the like stored in the ROM 13 via the bus 12. Further, the CPU 11 controls the servomotor 6, the spindle motor 8, and the like according to the machining program to machine the workpiece.

The bus 12 is a communication path that connects the pieces of hardware in the numerical controller 2 to one another. The pieces of hardware in the numerical controller 2 exchange data via the bus 12.

The ROM 13 is a storage device that stores the system program and the like for controlling the entire numerical controller 2.

The RAM 14 is a storage device that temporarily stores various data. The RAM 14 temporarily stores command information indicating a movement path of the tool, data for displaying, data input from the outside, and the like. The RAM 14 functions as a work area for the CPU 11 to process various data.

The nonvolatile memory 15 is a storage device that holds data even in a state where the machine tool 1 is powered off and no power is supplied to the numerical controller 2. The nonvolatile memory 15 includes, for example, a solid state drive (SSD). The nonvolatile memory 15 stores, for example, information regarding tool specifications such as a tool diameter, information regarding tool correction, information regarding tool life, and a machining program, which are input from the input device 4.

The numerical controller 2 further includes a first interface 16, a second interface 17, an axis control circuit 18, a spindle control circuit 19, a programmable logic controller (PLC) 20, and an I/O unit 21.

The first interface 16 connects the bus 12 with the display device 3. The first interface 16 sends, for example, various data processed by the CPU 11 to the display device 3.

The display device 3 receives various data via the first interface 16 and displays the various data. The display device 3 displays, for example, a machining program, information regarding tool correction, and the like, which are stored in the nonvolatile memory 15. The display device 3 is a display such as a liquid crystal display (LCD).

The second interface 17 connects the bus 12 with the input device 4. The second interface 17 sends, for example, data input from the input device 4 to the CPU 11 via the bus 12.

The input device 4 is a device for inputting various data. For example, the input device 4 receives input of information regarding tool correction and information regarding tool specifications, and sends the input data to the nonvolatile memory 15 via the second interface 17. The input device 4 is, for example, a keyboard and a mouse. Note that the input device 4 and the display device 3 may be configured as one device such as a touch panel, for example.

The axis control circuit 18 is a circuit that controls the servomotor 6. The axis control circuit 18 receives a control command from the CPU 11 and outputs a command for driving the servomotor 6 to the servo amplifier 5. The axis control circuit 18 transmits, for example, a torque command for controlling the torque of the servomotor 6 to the servo amplifier 5. Alternatively, the axis control circuit 18 may send a rotational speed command for controlling the rotational speed of the servomotor 6 to the servo amplifier 5.

The servo amplifier 5 receives a command from the axis control circuit 18 and supplies power to the servomotor 6.

The servomotor 6 is driven by the power supplied from the servo amplifier 5. The servomotor 6 is connected to, for example, a ball screw that drives a tool post, a spindle head, and a table. When the servomotor 6 is driven, the components of the machine tool 1 such as the tool post, the spindle head, and the table move, for example, in the X-axis direction, the Y-axis direction, or the Z-axis direction.

The spindle control circuit 19 is a circuit for controlling the spindle motor 8. The spindle control circuit 19 receives a control command from the CPU 11 and outputs a command for driving the spindle motor 8 to the spindle amplifier 7. The spindle control circuit 19 sends, for example, a torque command for controlling the torque of the spindle motor 8 to the spindle amplifier 7. Alternatively, the spindle control circuit 19 may send a rotational speed command for controlling the rotational speed of the spindle motor 8 to the spindle amplifier 7.

The spindle amplifier 7 receives a command from the spindle control circuit 19 and supplies power to the spindle motor 8.

The spindle motor 8 is driven by power supplied from the spindle amplifier 7. The spindle motor 8 is connected to the spindle and rotates the spindle.

The PLC 20 is a control device that executes a ladder program to control the peripheral equipment 9. The PLC 20 controls the peripheral equipment 9 via the I/O unit 21.

The I/O unit 21 is an interface that connects the PLC 20 with the peripheral equipment 9. The I/O unit 21 transmits a command received from the PLC 20 to the peripheral equipment 9.

The peripheral equipment 9 is a device that is installed in the machine tool 1 and performs an auxiliary operation when the machine tool 1 machines a workpiece. The peripheral equipment 9 may be a device installed near the machine tool 1. The peripheral equipment 9 is, for example, a tool changer and a robot such as a manipulator.

Next, functions of the respective units of the numerical controller 2 will be described.

Figure 2:
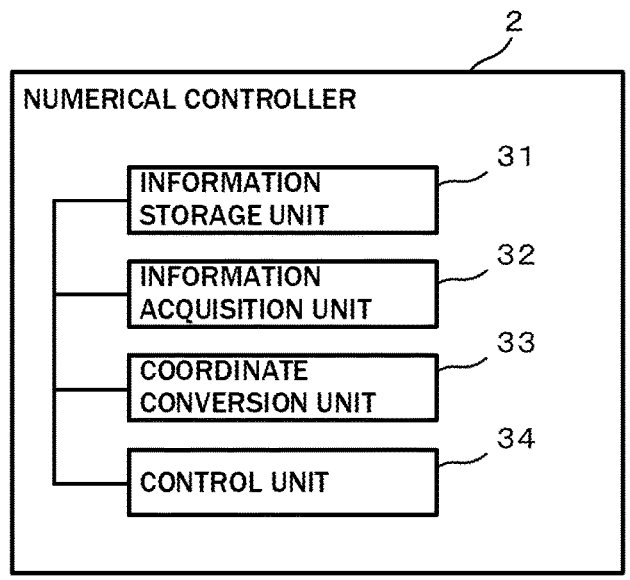
FIG. 2 is a block diagram illustrating an example of functions of a numerical controller.

FIG. 2 is a block diagram illustrating an example of functions of the numerical controller 2. The numerical controller 2 includes, for example, an information storage unit 31, an information acquisition unit 32, a coordinate conversion unit 33, and a control unit 34.

The information storage unit 31 is realized by storing, in the RAM 14 or the nonvolatile memory 15, data input from the input device 4 or the like or a calculation result of calculation processing by the CPU 11. In addition, the information acquisition unit 32, the coordinate conversion unit 33, and the control unit 34 are realized, for example, by the CPU 11 performing calculation processing using the system program and various data stored in the ROM 13. The CPU 11 executes the calculation processing using the RAM 14 as a work area.

The information storage unit 31 stores coordinate conversion information for converting a coordinate value in a rotating coordinate system into a coordinate value in a reference coordinate system.

The coordinate system is a generic term for an origin, coordinate axes, and the like serving as a reference for representing a position on the machine tool 1. The coordinate system is, for example, a three-axis orthogonal coordinate system including the X axis, the Y axis, and the Z axis orthogonal to one another.

The machine tool 1 machines a workpiece based on coordinate values in the reference coordinate system. In a case where the machine tool 1 is a machining center, the reference coordinate system is set such that, for example, the Z axis and the spindle are parallel, and the X axis and the Y axis are parallel to the movement direction of the table. In a case where the machine tool 1 is a lathe, the reference coordinate system is set such that, for example, the Z axis and the spindle are parallel to each other, and the X axis and the Y axis are parallel to the moving direction of the tool post.

The rotating coordinate system is a coordinate system set in accordance with the orientation of the tool or the cutting direction of the tool, and is a coordinate system obtained by rotating the reference coordinate system by a predetermined angle around a predetermined axis. The rotating coordinate system may further be a coordinate system translated in a predetermined axial direction as necessary.

Figure 3:
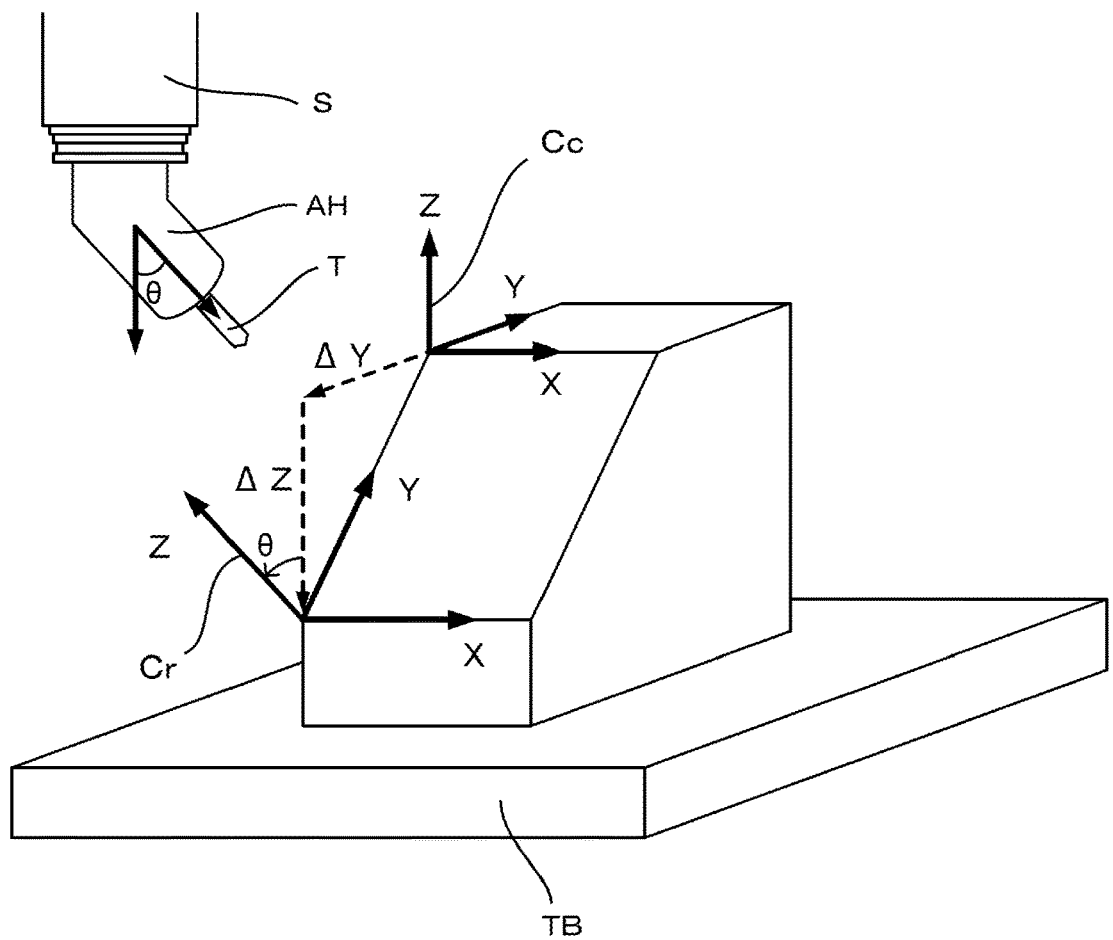
FIG. 3 is a diagram illustrating a relationship between a reference coordinate system and a rotating coordinate system.

FIG. 3 is a diagram illustrating a relationship between a reference coordinate system and a rotating coordinate system. The Z axis of the reference coordinate system Cc is parallel to the longitudinal direction of the spindle S, and the X axis and the Y axis are parallel to the moving direction of the table TB. The Z axis of the rotating coordinate system Cr is parallel to the longitudinal direction of the tool T. The rotating coordinate system Cr is a coordinate system obtained by rotating the reference coordinate system Cc by an angle θ around the X axis. The origin of the reference coordinate system Cc and the origin of the rotating coordinate system Cr do not necessarily coincide with each other. The origin of the rotating coordinate system Cr may be a point obtained by translating the origin of the reference coordinate system Cc in the X-axis, Y-axis, and Z-axis directions by ΔX, ΔY, and ΔZ, respectively.

The coordinate conversion information is information for converting a coordinate value in the rotating coordinate system Cr into a coordinate value in the reference coordinate system Cc. The coordinate conversion information is, for example, coordinate difference information indicating a difference between the reference coordinate system Cc and the rotating coordinate system Cr. The coordinate difference information includes information indicating a rotation center and information indicating a rotation angle of the rotating coordinate system Cr. However, the coordinate difference information does not include the parallel translation amounts ΔX, ΔY, and ΔZ from the origin of the reference coordinate system Cc to the origin of the rotating coordinate system Cr.

The coordinate conversion information is set according to the attachment direction of the tool T with respect to the spindle S. In the example illustrated in FIG. 3, the tool T is attached to an angle head AH for inclining by an angle θ around the X axis with respect to the spindle S. In this case, the coordinate conversion information includes information indicating the X axis, which is the rotation center of the rotating coordinate system Cr, and the angle θ.

The information storage unit 31 also stores the coordinate conversion information in association with the unique identification information assigned to each tool T. The unique identification information assigned to the tool T is, for example, a tool number of each tool T. The information storage unit 31 may store information indicating the tool type in association with identification information unique to each tool T.

Figures 4, 5:
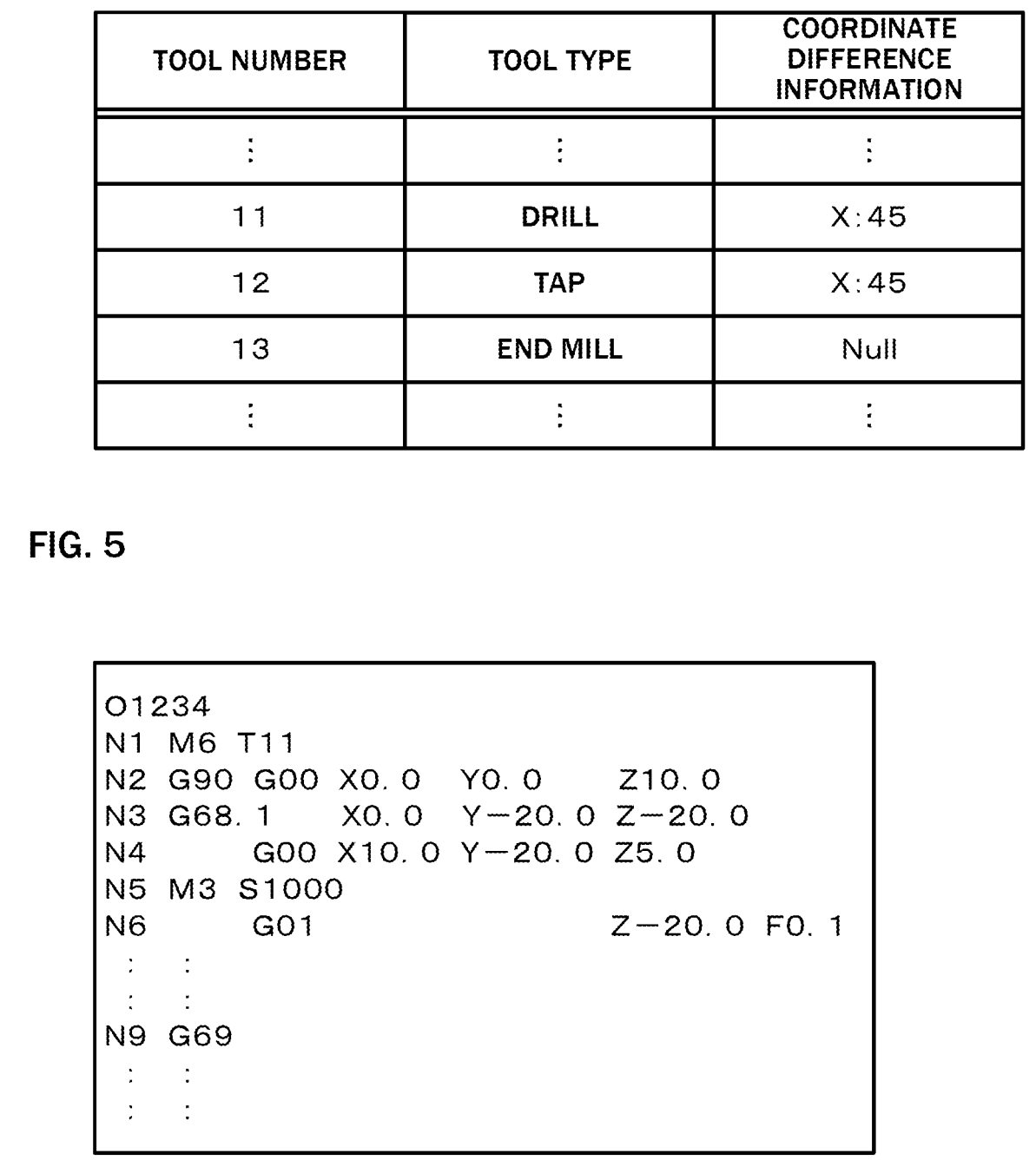

FIG. 4 is a diagram illustrating an example of information stored in the information storage unit 31. The information storage unit 31 stores information indicating a tool type and coordinate conversion information in association with a tool number.

Specifically, the tool number 11 is stored in association with "drill" as the tool type, and "X: 45" as the coordinate conversion information. "X: 45" indicates that the rotating coordinate system Cr is rotated by 45 degrees around the X axis of the reference coordinate system Cc. In other words, it is indicated that the tool T is attached in a direction rotated by 45 degrees around the X axis with respect to the longitudinal direction of the spindle S.

The tool number 12 is stored in association with "tap" as a tool type and "X: 45" as coordinate conversion information. In addition, the tool number 13 is stored in association with "end mill" as a tool type and "Null" as coordinate conversion information. "Null" indicates that there is no difference between the rotating coordinate system Cr and the reference coordinate system Cc, and the tool T is attached so that the longitudinal direction of the tool T is in parallel with the longitudinal direction of the spindle S.

The coordinate conversion information is input from the input device 4 by the user, for example, and is stored in the information storage unit 31.

Here, the description returns to FIG. 2.

The information acquisition unit 32 reads the machining program and decodes the read machining program. The information acquisition unit 32 also acquires machining command information from the decoded machining program. The machining command information includes a tool exchange command and a coordinate conversion command. Further, the machining command information includes command information indicating a movement path of the tool T, such as a positioning command and a linear interpolation command.

FIG. 5 is a diagram illustrating an example of the machining program used for machining a workpiece.

A command "M6 T11" in the first line is a tool exchange command for the tool T with the tool number 11.

The commands "G90" and "G00 X0.0 Y0.0 Z10.0" in the second line are an absolute command and a positioning command, respectively. These commands are commands for positioning the tool T at positions (0.0, 0.0, 10.0) in the reference coordinate system Cc.

The commands "G68.1" and "X0.0 Y-20.0 Z-20.0" in the third line respectively indicate the coordinate conversion command and the parallel translation amount from the origin of the reference coordinate system Cc to the origin of the rotating coordinate system Cr. This parallel translation amount is designated by a coordinate value in the reference coordinate system Cc. In addition, in a case where only "G68.1" is sent as a command, it is assumed that there is no parallel translation amount. In other words, the origin of the reference coordinate system Cc coincides with the origin of the rotating coordinate system Cr. The coordinate conversion command is a command for converting the coordinate values into coordinate values in the reference coordinate system Cc until the coordinate conversion is canceled. In other words, the coordinate values written between the coordinate conversion command and the coordinate conversion cancel command are coordinate values in the rotating coordinate system Cr, and are converted into coordinate values in the reference coordinate system Cc by the later described coordinate conversion unit 33.

A command "G00 X10.0 Y-20.0 Z5.0" in the fourth line is a positioning command. The coordinate value in the positioning command is a coordinate value in the rotating coordinate system Cr.

A command "M3 S1000" in the fifth line is a spindle forward rotation command. The spindle forward rotation command is a command to rotate the spindle S forward at a rotation speed of 1,000 [rpm].

A command "G01 Z-20.0 F0.1" in the sixth line is a linear interpolation command. This linear interpolation command is a command to move the tool T to a position of Z: −20 at a feed speed of 0.1 [mm/rev].

A command "G69" in the ninth line is a coordinate conversion cancel command. This command cancels the coordinate conversion.

The information acquisition unit 32 acquires these pieces of machining command information from the machining program.

Here, the description returns to FIG. 2 again.

When the coordinate conversion command is acquired by the information acquisition unit 32, the coordinate conversion unit 33 converts the coordinate values indicating the movement path of the tool T acquired by the information acquisition unit 32 based on the coordinate conversion information. The coordinate conversion unit 33 converts the coordinate values indicating the movement path of the tool T between the execution of the coordinate conversion command and the execution of the coordinate conversion cancel command.

For example, when the information illustrated in FIG. 4 is stored in the information storage unit 31 and the machining program illustrated in FIG. 5 is executed, the coordinate conversion unit 33 converts the coordinate values (10.0, −20.0, 5.0) in the positioning command for the tool T and the coordinate values (10.0, −20.0, −20.0) in the linear interpolation command, based on the coordinate conversion information "X: 45" associated with the tool T with the tool number 11 and the parallel translation amount "X0.0 Y-20.0 Z-20.0" from the origin of the reference coordinate system Cc. Specifically, the coordinate conversion unit 33 performs coordinate conversion by rotating these coordinate values by 45 degrees around the X axis and translating these coordinate values by 0.0, −20.0, and −20.0 in the X axis, Y axis, and Z axis directions, respectively.

For example, the coordinate conversion unit 33 generates a coordinate conversion matrix for converting a coordinate value in the rotating coordinate system Cr into a coordinate value in the reference coordinate system Cc based on the coordinate conversion information. When the rotating coordinate system Cr is a coordinate system rotated by an angle θ around the X axis with respect to the reference coordinate system Cc, the coordinate conversion unit 33 obtains a coordinate value in the reference coordinate system Cc by multiplying a coordinate value acquired from the machining program by a coordinate conversion matrix $R_x(\theta)$ expressed by the following Formula 1. With this configuration, the coordinate values in the rotating coordinate system Cr acquired from the machining program can be converted into the coordinate values in the reference coordinate system Cc.

$$R_x(\theta) = \begin{bmatrix} 1 & 0 & 0 \\ 0 & \cos\theta & -\sin\theta \\ 0 & \sin\theta & \cos\theta \end{bmatrix}$$ [Equation 1]

Here, the description returns to FIG. 2.

The control unit 34 controls each axis based on the machining program decoded by the information acquisition unit 32 to machine the workpiece. The control unit 34 controls each axis based on a coordinate value in the reference coordinate system Cc. When a coordinate conversion command is instructed in the machining program, the control unit 34 controls the movement of the tool T based on the coordinate values converted by the coordinate conversion unit 33.

Next, processing executed in the numerical controller 2 at the time of machining the workpiece will be described.

Figure 6:
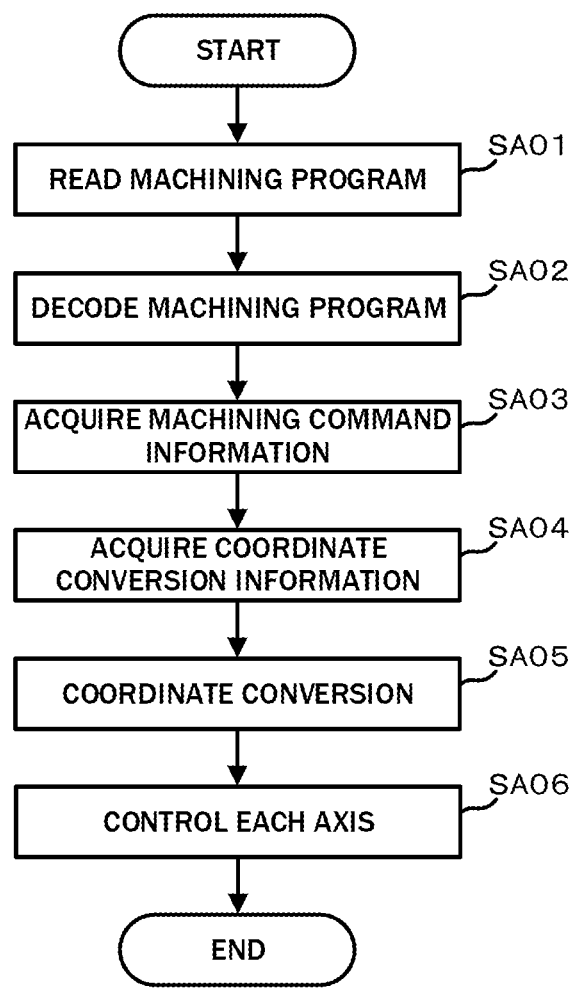
FIG. 6 is a flowchart illustrating an example of processing executed at the time of machining a workpiece.

FIG. 6 is a flowchart illustrating processing executed in the numerical controller 2 during machining of a workpiece.

First, the information acquisition unit 32 reads a machining program (step SA01).

Next, the information acquisition unit 32 decodes the read machining program (step SA02).

Next, the information acquisition unit 32 acquires machining command information from the decoded machining program (step SA03).

Next, when the machining command information includes the coordinate conversion command, the information acquisition unit 32 acquires the coordinate conversion information stored in the information storage unit 31 (step SA04).

Next, the coordinate conversion unit 33 converts the coordinate values indicating the movement path of the tool T written between the coordinate conversion command and the coordinate conversion cancel command based on the coordinate conversion information (step SA05).

Finally, the control unit 34 controls each axis based on the machining command information, the converted coordinate values, and the like (step SA06).

As described above, the numerical controller 2 according to the first embodiment includes the information storage unit 31 that stores the coordinate conversion information for converting a coordinate value in the rotating coordinate system Cr into a coordinate value in the reference coordinate system Cc, in association with the identification information assigned to the tool T, the information acquisition unit 32 that acquires, from the machining program, the coordinate values indicating the movement path of the tool T to which the identification information is assigned, and the coordinate conversion unit 33 that converts the coordinate value acquired by the information acquisition unit 32 based on the coordinate conversion information stored in the information storage unit 31.

Therefore, it is not necessary to write, in the machining program, information such as the rotation center, the rotation direction, and the rotation amount of the coordinate system for coordinate conversion. With this configuration, readability of the machining program can be improved, and machining errors can be reduced.

In addition, in the numerical controller 2 according to the first embodiment, the coordinate conversion information includes coordinate difference information indicating a difference between the rotating coordinate system Cr and the reference coordinate system Cc, and the coordinate conversion unit 33 performs coordinate conversion based on the coordinate difference information.

Therefore, the information stored in the information storage unit 31 can be simplified.

Second Embodiment

Hereinafter, a second embodiment will be described with reference to the drawings. Note that description of the same configuration as that of the first embodiment will be omitted.

As illustrated in FIG. 2, the numerical controller 2 includes, for example, an information storage unit 31, an information acquisition unit 32, a coordinate conversion unit 33, and a control unit 34.

The information storage unit 31 stores coordinate conversion information for converting a coordinate value in the rotating coordinate system Cr into a coordinate value in the reference coordinate system Cc. The coordinate conversion information includes reference direction information and cutting direction information.

The reference direction information is information indicating a reference machining direction determined according to the tool type. For example, when the tool T is a turning tool such as a cutting tool, the reference machining direction is the −X direction in the reference coordinate system Cc.

The cutting direction information is information indicating the cutting direction of the tool T. For example, when the turning tool is attached substantially parallel to the X-Z plane in the reference coordinate system Cc and the cutting is performed in the −X direction, the cutting direction of the turning tool is the −X direction. In this case, the reference machining direction coincides with the cutting direction of the tool T.

On the other hand, when the turning tool is attached substantially parallel to the Y-Z plane in the reference coordinate system Cc and the cutting is performed in the −Y direction, the cutting direction of the turning tool is the −Y direction. In this case, the cutting direction of the tool is a direction obtained by rotating the reference machining direction by 90 degrees around the Z axis.

Figure 7:
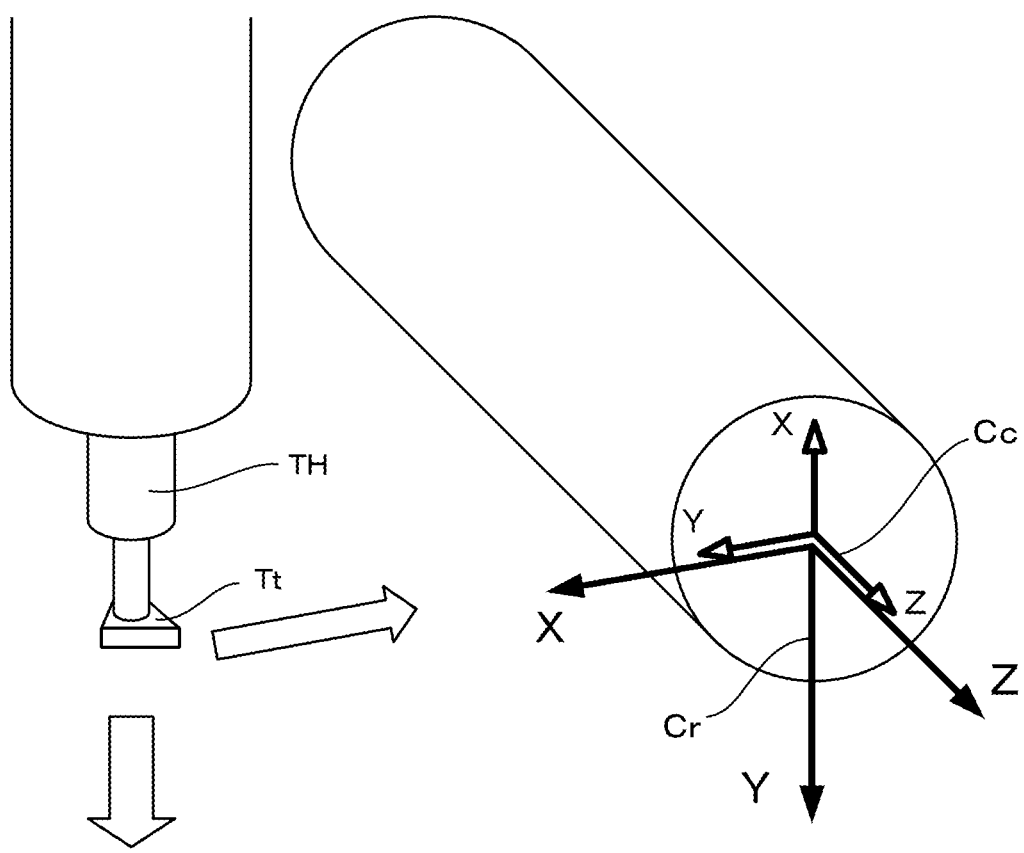
FIG. 7 is a diagram for explaining a reference machining direction and a cutting direction.

FIG. 7 is a diagram for explaining a reference machining direction and a reference cutting direction. In FIG. 7, a turning tool Tt is attached to the tool holder TH. In this case, the reference machining direction is the −X direction in the reference coordinate system Cc. Further, the turning tool Tt is attached substantially parallel to the Y-Z plane in the reference coordinate system Cc, and the turning tool Tt is cut in the −Y direction during turning of the workpiece. In this case, the cutting direction of the turning tool Tt is the −Y direction. In other words, the cutting direction of the turning tool Tt is a direction obtained by rotating the reference machining direction by 90 degrees around the Z axis.

FIG. 8 is a diagram illustrating an example of information stored in the information storage unit 31. The information storage unit 31 stores information indicating a tool type, reference direction information, and cutting direction information in association with the tool number.

Specifically, the tool number 121 is stored in association with "turning" as the tool type, "−X" as the reference direction information, and "Null" as the cutting direction information. In this case, the cutting direction of the tool T coincides with the reference machining direction.

The tool number 122 is stored in association with "turning" as a tool type, "−X" as reference direction information, and "−Y" as cutting direction information. In this case, the tool T is attached substantially parallel to the Y-Z plane in the reference coordinate system Cc, and is cut in the −Y direction.

The tool number 123 is stored in association with "thread cutting" as a tool type, "−X" as reference direction information, and "Null" as cutting direction information. In this case, the cutting direction of the thread cutting tool coincides with the reference machining direction.

The information acquisition unit 32 (see FIG. 2) reads a machining program and decodes the machining program. The information acquisition unit 32 acquires machining command information from the decoded machining program. The machining command information includes a tool exchange command and a coordinate conversion command. Further, the machining command information includes command information indicating a movement path of the tool T, such as a positioning command and a linear interpolation command.

When the coordinate conversion command is acquired by the information acquisition unit 32, the coordinate conversion unit 33 (see FIG. 2) converts the coordinate values indicating the movement path of the tool T acquired by the information acquisition unit 32 based on the coordinate conversion information. The coordinate conversion unit 33 converts the coordinate values indicating the movement path of the tool T between the execution of the coordinate conversion command and the execution of the coordinate conversion cancel command.

The coordinate conversion unit 33 performs coordinate conversion based on the reference direction information and the cutting direction information. The coordinate conversion unit 33 performs coordinate conversion based on the difference between the reference machining direction indicated by the reference direction information and the cutting direction indicated by the cutting direction information.

For example, when the information illustrated in FIG. 8 is stored in the information storage unit 31 and the machining program illustrated in FIG. 9 is executed, the coordinate conversion unit 33 converts the coordinate values instructed between the coordinate conversion command "G68.1" and the coordinate conversion cancellation command "G69" based on the reference direction information "−X" and the cutting direction information "−Y" associated with the tool number 122.

Here, the difference between the cutting direction of the turning tool Tt with the tool number 122 and the reference machining direction is 90 degrees around the Z axis. In this case, the rotating coordinate system Cr is a coordinate system obtained by rotating the reference coordinate system Cc by 90 degrees around the Z axis. Therefore, the coordinate conversion unit 33 performs coordinate conversion by obtaining a coordinate value that is a value that the coordinate values instructed between the coordinate conversion command and the coordinate conversion cancellation command is rotated by 90 degrees around the Z axis.

For example, the coordinate conversion unit 33 generates a coordinate conversion matrix for converting a coordinate value in the rotating coordinate system Cr into a coordinate value in the reference coordinate system Cc based on the coordinate conversion information. The coordinate conversion unit 33 multiplies the generated coordinate conversion matrix by the coordinate values in the rotating coordinate system Cr to obtain the coordinate values in the reference coordinate system Cc.

The control unit 34 controls each axis based on the machining program decoded by the information acquisition unit 32 to machine the workpiece. The control unit 34 controls each axis based on a coordinate value in the reference coordinate system Cc. When the coordinate conversion command is instructed in the machining program, the control unit 34 controls the movement of the tool T based on the coordinate value in the reference coordinate system Cc subjected to the coordinate conversion by the coordinate conversion unit 33.

As described above, in the numerical controller 2 according to the second embodiment, the coordinate conversion information includes the reference direction information indicating the machining direction serving as the reference of the tool T set for each tool T and the cutting direction information indicating the cutting direction of the tool T, and the coordinate conversion unit 33 performs the coordinate conversion based on the difference between the direction indicated by the reference direction information and the direction indicated by the cutting direction information.

Therefore, it is not necessary to write, in the machining program, information such as the rotation center, the rotation direction, and the rotation amount of the coordinate system for coordinate conversion. With this configuration, readability of the machining program can be improved, and machining errors can be reduced.

Third Embodiment

Hereinafter, a third embodiment will be described with reference to the drawings. Note that description of the same configuration as that of the first embodiment will be omitted.

As illustrated in FIG. 2, the numerical controller 2 includes, for example, an information storage unit 31, an information acquisition unit 32, a coordinate conversion unit 33, and a control unit 34.

The information storage unit 31 stores coordinate conversion information for converting a coordinate value in the rotating coordinate system Cr into a coordinate value in the reference coordinate system Cc. The coordinate conversion information includes reference direction information.

The reference direction information is information indicating a reference machining direction determined according to the tool type. For example, when the tool T is the turning tool Tt such as a cutting tool, the machining direction serving as the reference of the tool T is the −X direction in the reference coordinate system Cc.

FIG. 10 is a diagram illustrating an example of information stored in the information storage unit 31. The information storage unit 31 stores information indicating a tool type and reference direction information in association with a tool number. Specifically, the tool number 131 is stored in association with "turning" as the tool type and "−X" as the reference direction information.

The tool number 132 is stored in association with "turning" as the tool type and "−X" as the reference direction information.

The tool number 133 is stored in association with "thread cutting" as a tool type and "−X" as reference direction information.

The information acquisition unit 32 (see FIG. 2) reads a machining program and decodes the machining program. The information acquisition unit 32 acquires machining command information from the decoded machining program. The machining command information includes a tool exchange command and a coordinate conversion command. Further, the machining command information includes command information indicating a movement path of the tool T, such as a positioning command and a linear interpolation command.

When the coordinate conversion command is acquired by the information acquisition unit 32, the coordinate conversion unit 33 acquires position information indicating the position of the tool T. The coordinate conversion unit 33 converts the coordinate values indicating the movement path of the tool T acquired by the information acquisition unit 32 based on the coordinate conversion information and the position information indicating the position of the tool T. The coordinate conversion unit 33 converts the coordinate values indicating the movement path of the tool T between the execution of the coordinate conversion command and the execution of the coordinate conversion cancel command.

For example, when the information illustrated in FIG. 10 is stored in the information storage unit 31 and the machining program illustrated in FIG. 11 is executed, the position information of the tool T is acquired from the positioning command "G90 G00 X0.0 Y50.0 250.0" of the tool T with the tool number 132. In other words, the position information indicating the position of the tool at the time of coordinate conversion is acquired. The cutting direction of the tool T is determined based on the acquired position information of the tool T. For example, when the tool T is positioned on the +Y side on the Y-Z plane by the positioning command, it is determined that the cutting direction of the tool T is the −Y direction.

On the other hand, the reference machining direction of the tool T with the tool number 132 is the "−X" direction. That is, the cutting direction of the tool T is a direction obtained by rotating the reference machining direction by 90 degrees around the Z axis. In other words, the difference between the machining direction as the reference of the tool T and the cutting direction is 90 degrees around the Z axis. In this case, the rotating coordinate system Cr in which the movement path of the tool is instructed is a coordinate system obtained by rotating the reference coordinate system Cc by 90 degrees around the Z axis. Therefore, the coordinate conversion unit 33 performs coordinate conversion by obtaining a coordinate value that is a value that the coordinate values instructed between the coordinate conversion command and the coordinate conversion cancellation command is rotated by 90 degrees around the Z axis.

The control unit 34 controls each axis based on the machining program decoded by the information acquisition unit 32 to machine the workpiece. When the coordinate conversion command is instructed in the machining program, the control unit 34 controls the movement of the tool T based on the coordinate value in the reference coordinate system Cc subjected to the coordinate conversion by the coordinate conversion unit 33.

Figure 12:
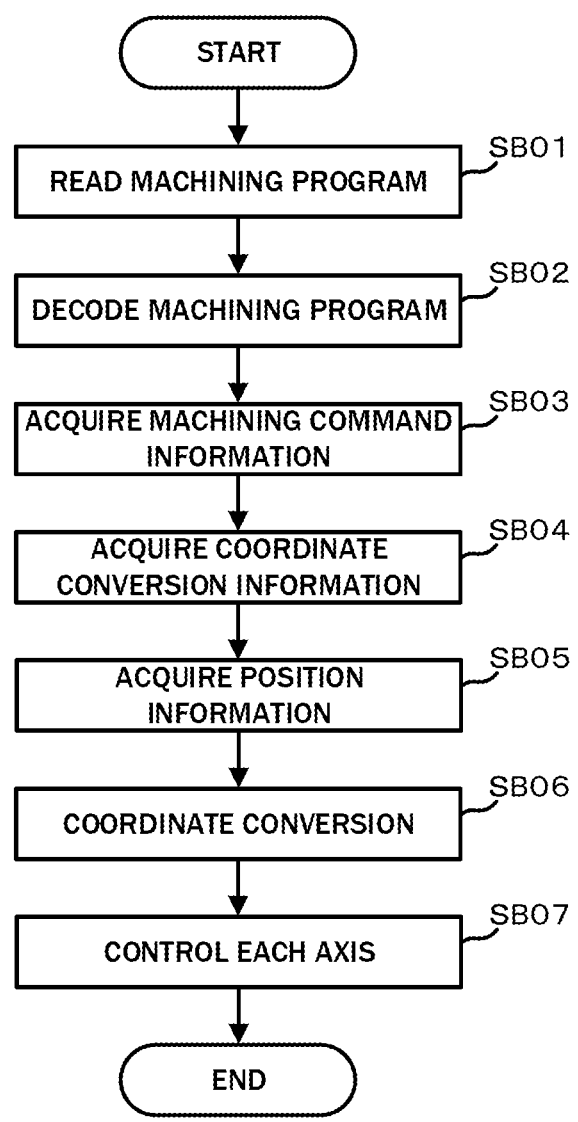
FIG. 12 is a flowchart illustrating another example of processing executed at the time of machining a workpiece.

FIG. 12 is a flowchart illustrating an example of processing executed in the numerical controller 2 during machining of a workpiece.

First, the information acquisition unit 32 reads a machining program (step SB01).

Next, the information acquisition unit 32 decodes the read machining program (step SB02).

Next, the information acquisition unit 32 acquires machining command information from the decoded machining program (step SB03).

Next, when the machining command information includes the coordinate conversion command, the information acquisition unit 32 acquires the coordinate conversion information stored in the information storage unit 31 (step SB04).

Next, the coordinate conversion unit 33 acquires position information indicating the position of the tool T (step SB05).

Next, the coordinate conversion unit 33 converts the coordinate values indicating the movement path of the tool T written between the coordinate conversion command and the coordinate conversion cancel command into coordinate values in the reference coordinate system Cc based on the coordinate conversion information and the position information indicating the position of the tool T (step SB06).

Finally, the control unit 34 controls each axis based on the machining command information, the converted coordinate values, and the like (step SB07).

As described above, in the numerical controller 2 according to the third embodiment, the coordinate conversion information includes the reference machining direction information indicating the reference machining direction set for each tool T, and the coordinate conversion unit 33 executes the coordinate conversion based on the reference machining direction information and the position information of the tool T.

Therefore, it is not necessary to write information related to the coordinate system for coordinate conversion in the machining program. With this configuration, readability of the machining program can be improved, and machining errors can be reduced.

Note that the configurations according to the first embodiment, the second embodiment, and the third embodiment described above may be appropriately combined.

REFERENCE SIGNS LIST

1 Machine tool
2 Numerical controller
3 Display device
4 Input device
5 Servo amplifier
6 Servomotor
7 Spindle amplifier
8 Spindle motor
9 Peripheral equipment
11 CPU
12 Bus 13 ROM
14 RAM
15 Nonvolatile memory
16 First interface
17 Second interface
18 Axis control circuit
19 Spindle control circuit
20 PLC
21 I/O unit
31 Information storage unit
32 Information acquisition unit
33 Coordinate conversion unit
34 Control unit
AH Angle head
Cc Reference coordinate system
Cr Rotating coordinate system
S Spindle
TB Table
T Tool
Tt Turning tool
TH Tool holder

The invention claimed is:

1. A numerical controller comprising a processor,
wherein the processor is configured to:
store, in association with identification information assigned to a tool, coordinate conversion information used to convert a coordinate value in a rotating coordinate system into a coordinate value in a reference coordinate system;
acquire, from a machining program, a coordinate value that indicates a movement path of the tool to which the identification information is assigned; and
perform coordinate conversion of the coordinate value indicating the movement path acquired by the information acquisition unit, based on the coordinate conversion information stored in the information storage unit, wherein
the coordinate conversion information includes coordinate difference information that indicates a difference between the rotating coordinate system and the reference coordinate system, and
the processor is further configured to perform the coordinate conversion based on the coordinate difference information.

2. The numerical controller according to claim 1, wherein
the coordinate conversion information includes reference direction information that indicates a reference machining direction of the tool, which is set for each tool, and cutting direction information that indicates a cutting direction of the tool, and
the processor is further configured to perform the coordinate conversion based on a difference between the direction indicated by the reference direction information and the direction indicated by the cutting direction information.

3. A machine tool comprising the numerical controller according to claim 1.

4. A numerical controller comprising a processor,
wherein the processor is configured to:
store, in association with identification information assigned to a tool, coordinate conversion information used to convert a coordinate value in a rotating coordinate system into a coordinate value in a reference coordinate system;
acquire, from a machine program, a coordinate value that indicates a movement path of the tool to which the identification information is assigned; and
perform coordinate conversion of the coordinate value indicating the movement path acquired by the information acquisition unit, based on the coordinate conversion information stored in the information storage unit, wherein
the coordinate conversion information includes reference machining direction information that indicates a reference machining direction of the tool, which is set for each tool, and
the processor is further configured to perform the coordinate conversion based on the reference machining direction information and position information of the tool.

5. A machine tool comprising the numerical controller according to claim 4.

* * * * *